(12) United States Patent
Springer et al.

(10) Patent No.: US 8,702,008 B2
(45) Date of Patent: Apr. 22, 2014

(54) RFID TRANSPONDER CHIP WITH A PROGRAMMABLE WAKE-UP

(75) Inventors: James Springer, Colorado Springs, CO (US); David A. Kamp, Monument, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 13/488,765

(22) Filed: Jun. 5, 2012

(65) Prior Publication Data

US 2013/0320096 A1 Dec. 5, 2013

(51) Int. Cl.
*G06K 19/06* (2006.01)
(52) U.S. Cl.
USPC .......................................... 235/492; 235/451
(58) Field of Classification Search
USPC ............. 235/451, 492; 340/10.1, 10.2, 572.1, 340/572.2, 572.5
See application file for complete search history.

(56) References Cited

U.S. PATENT DOCUMENTS

| | | | |
|---|---|---|---|
| 6,525,362 B2 * | 2/2003 | Sadayuki | 257/298 |
| 6,922,134 B1 | 7/2005 | Yones | |
| 6,980,084 B1 | 12/2005 | Yones | |
| 7,868,764 B2 * | 1/2011 | Wall et al. | 340/572.5 |
| 2004/0036626 A1 * | 2/2004 | Chan et al. | 340/870.17 |
| 2006/0061412 A1 * | 3/2006 | Molina et al. | 327/539 |
| 2008/0136594 A1 * | 6/2008 | Jung et al. | 340/10.1 |
| 2010/0039267 A1 * | 2/2010 | Wall et al. | 340/572.5 |
| 2011/0090063 A1 * | 4/2011 | Koons et al. | 340/10.33 |

FOREIGN PATENT DOCUMENTS

EP 1 102 158 A1 5/2001

* cited by examiner

*Primary Examiner* — Tuyen K Vo
(74) *Attorney, Agent, or Firm* — Sughrue Mion, PLLC

(57) ABSTRACT

An RFID transponder chip includes at least one antenna to pick-up and transmit radio-frequency signals, a rectifier to store charge on at least one capacitor at a rectified voltage from the picked-up radio-frequency signals, a power-on reset circuit to maintain a logic unit in a reset state if the rectified voltage level is less than a power-on reset or wake-up voltage of the power-on reset circuit for operating the logic unit. The RFID transponder chip further includes a non-volatile memory, in which are stored one or several trim values. Said non-volatile memory is directly connected to the power-on reset circuit to be able to provide at least one trim value to trim the power-on reset circuit at a rectified voltage level below a wake-up voltage level.

15 Claims, 2 Drawing Sheets

RFID TRANSPONDER CHIP WITH A PROGRAMMABLE WAKE-UP

FIELD OF THE INVENTION

The present invention relates to an RFID transponder chip with a programmable wake-up. Said RFID transponder chip includes in particular an antenna to pick-up radio-frequency signals, a rectifier to store charge on capacitors at a rectified voltage from the picked-up radio-frequency signals, and a power-on reset circuit to maintain a logic unit in a reset state if the rectified voltage level is less than a power-on reset or wake-up voltage of the power-on reset circuit from which the logic unit can operate.

BACKGROUND OF THE INVENTION

In order to wake-up a conventional passive RFID transponder chip, the rectified voltage from an RF signal picked-up by the antenna of the chip has to be greater than a power-on reset voltage previously set. When the rectified voltage across capacitors is sufficient from an RF signal picked-up by the antenna, the chip circuit is powered to communicate with a reader. Usually some power-on reset trim values can be stored in a non-volatile memory of the transponder chip. Said trim values can be applied from the non-volatile memory to a power-on reset circuit of the chip in order to trim the level of the power-on reset voltage, when the transponder chip is in operation. However, the non-volatile memory stays disabled as do several electronic parts of the chip, and cannot be read, if the rectified voltage is under the level of an untrimmed power-on reset voltage. With an initial untrimmed power-on reset voltage, which is greater than a trimmed power-on reset voltage, the distance between a reader and the RFID transponder chip must be reduced or the reader RF power increased in order to power the chip for normal operation. So the chip sensitivity of a conventional passive RFID transponder chip is poor, which is a drawback.

It is also to be noted that according to manufacturing and temperature variation of the chip, the power-on reset voltage varies resulting in a specified sensitivity. This can represent the expected worst case of the power-on reset voltage plus some margin. For an improved sensitivity specification, the power-on reset circuit has to be trimmed to reduce the variation of the power-on reset voltage. Usually the trim values are determined during the testing of the RFID transponder chips prior to shipment and stored in a non-volatile memory.

In the EP patent application No. 1 102 158 A1, it is described a device and a method for controlling the operation of an electronic system in a "grey zone". Said operation begins after the power supply exceeds the power-on reset voltage by some amount. Said electronic system includes in particular a microprocessor able to operate at a guaranteed minimum voltage, which can be for example greater than the power-on reset voltage. In such a device, if the trim values are to be applied for the power-on reset circuit, the non-volatile memory is read after wake-up of the chip, and the trim values are applied resulting in a change from the untrimmed power-on reset voltage level to a newly trimmed power-on reset voltage level. If the untrimmed power-on reset voltage level is higher than the trimmed power-on reset voltage level, then the sensitivity is initially worse, but said sensitivity is then better after applying the trim values. This is because the power supply can be maintained at a lower level without falling below the trimmed power-on reset voltage level. In practice, it means that for the first communication the transponder chip must be brought close to the reader to awaken before it can be moved further away while staying awake, which is a drawback.

The U.S. Pat. No. 6,922,134 B1 describes a programmable trimmer for a transponder chip. Said transponder chip includes a dedicated EEPROM memory, which holds trim data values that are an integral portion of the EEPROM main memory. These trim dedicated cells of the EEPROM memory share bit lines with other non-trim cells, and are written via the shared bit lines. Trim and non-trim cells must be written at different time periods. The write circuitry must be designed for the load of both trim and non-trim cells. The read circuitry contains the sense function and is separately supplied with power. So in this case, it is necessary to wait for wake-up of the transponder chip before eventually tuning the power-on reset circuit with trim data values stored in said EEPROM memory, which is a drawback.

U.S. Pat. No. 6,980,084 B1 describes a power-on reset for a transponder chip. The power-on reset circuit of the transponder chip is used in a tire pressure monitoring system. Low power components enable the power-on reset circuit to be functional beginning at a power supply level below a sustain voltage. Other transponder chips become functional at a higher power supply level just under a start voltage. A trim bit value from a non-volatile memory controls an analog function upon which sustain voltage level is dependent. The value controls the selection of one of two sustain voltage levels, a higher level for passive mode and the lower level for active mode. The trim bit value also controls the power supply rising and falling reset trip behavior. When the reset output is high, the transponder chip is disabled and will not communicate.

In passive mode, the reset output goes low when the power supply rises above the start voltage and goes high when the power supply falls below the sustain voltage. This allows an on-chip backscatter modulator to operate starting at a higher power supply without loading and dragging down the power supply enough to cause a reset to assert high. In active mode, the reset output is low whenever the condition of the power supply greater than the sustain voltage is met. Since the transponder chip is powered by a battery, a lower reset condition is possible because the battery can supply more current into the load presented by an "on" modulator without momentarily dropping the power supply. This reset functionality is further combined with a minimum delay for asserting the reset output such that if power supply to the transponder chip increases quickly, there is enough time for analog circuits to stabilize prior to the start of communication. The concept in U.S. Pat. No. 6,980,084 does not trim the power-on reset release voltage for a rising power supply level, rather it trims the falling power-on reset assert voltage by mode (passive or active) and not even by chip, which is a drawback.

SUMMARY OF THE INVENTION

It is thus a main object of the invention to provide an RFID transponder chip which overcomes the drawbacks of the prior art in order to improve the sensitivity and able to be awake at low voltage for establishing quickly a first communication with another electronic unit.

The invention therefore concerns an RFID transponder chip, which includes at least one antenna to pick-up radio-frequency signals, a rectifier to store on at least one capacitor a rectified voltage from the picked-up radio-frequency signals, and a power-on reset circuit to maintain a logic unit in a reset state if the rectified voltage level is less than a power-on reset or wake-up voltage of the power-on reset circuit from which the logic unit can operate, wherein the RFID transponder chip further includes a non-volatile memory, in which are stored one or several trim values, said non-volatile memory being directly connected to the power-on reset circuit in order to be able to provide at least one trim value to trim the power-on reset circuit at a rectified voltage level below a wake-up voltage level.

Some particular embodiments of the RFID transponder chip are defined in the dependent claims 2 to 12.

One advantage of the RFID transponder chip of the present invention lies in the fact that there is an improved sensitivity on a first communication of the transponder chip with a reader. A low-voltage non-volatile memory is provided in order to be able to be read first after radio-frequency signals are picked up by the antenna and the rectifier stores charge from the signals at a rectified voltage on at least one capacitor. Said non-volatile memory can immediately provide trim power-on reset values applied for a power-on reset circuit of the transponder chip, at a power supply level below the untrimmed power-on reset or wake-up voltage level. So during the increasing rectified voltage level, said non-volatile memory can be powered before achieving the wake-up voltage level of the other electronic parts of the chip. The non-volatile memory used for storing some trim power-on reset values is generally independent of other non-volatile memory integrated for example in the same chip, which allows separated control and performance optimization.

Another advantage of the RFID transponder chip of the present invention lies in the fact that the stored trim values from the non-volatile memory don't directly depend on parameters of the manufacturing process and on temperature variations. There is less variability in the power difference between wake-up and subsequent reset with power loss. The trim power-on reset values can be applied to the power-on reset circuit at or below the lowest possible wake-up voltage, which can be less than the untrimmed power-on reset voltage from the power-on reset circuit. A best sensitivity specification for a large group of chips can be achieved.

BRIEF DESCRIPTION OF THE DRAWINGS

Other aspects, features and advantages of the present invention will be apparent upon reading the following detailed description of non-limiting example and embodiment made with reference to the accompanying drawings, in which.

DETAILED DESCRIPTION OF THE INVENTION

The following description concerns specifically an RFID transponder chip with a programmable wake-up in order to trim a power-on reset circuit at a low voltage. As several parts of such an RFID transponder chip are well known in this technical field, they will be described not in detail.

Figure 1:
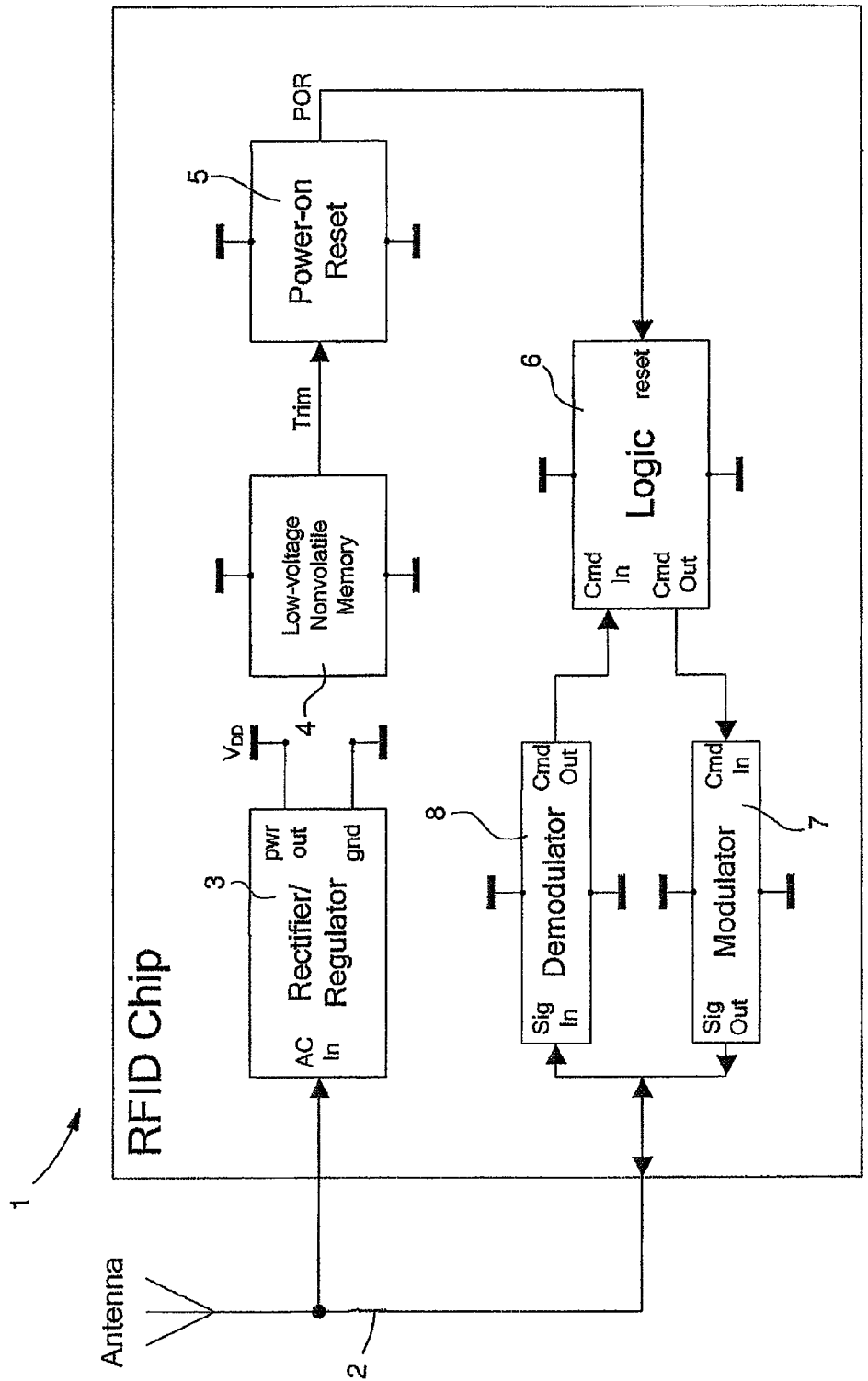
FIG. 1 shows a simplified view of an embodiment of an RFID transponder chip with a programmable wake-up of the present invention.

FIG. 1 shows a low-voltage RFID transponder chip 1, which can be for example of a passive type without using a power supply source, such as a battery. In this case, said low-voltage RFID transponder chip 1 comprises an antenna 2 to pick-up radio-frequency signals and a rectifier 3, which is connected to the antenna 2. The rectifier can rectify the picked-up radio-frequency signals and store charge at a rectified voltage $V_{DD}$ on at least one capacitor (not shown) at the output of the rectifier 3. Preferably a rectifier-regulator 3 is used to rectify an AC input voltage and create the rectified DC voltage $V_{DD}$ across the capacitor based on the harvested energy from the radio-frequency signals picked-up by the antenna 2 and to regulate said rectified voltage to generate a regulated voltage. The rectified voltage $V_{DD}$ or the regulated voltage can be used to supply power to all the electronic components of the transponder chip 1 if the rectified voltage has a sufficient voltage level, for example, at a voltage approximately equal to 1.2 V. However the sufficient voltage can be also designed for 1 V or 1.4 V. The sufficient voltage can be also lower than 1 V for smaller dimension technologies.

The low-voltage RFID transponder chip 1 further includes a low-voltage non-volatile memory 4, in a part of which one or several trim values are stored, a power-on reset circuit 5, a logic unit 6, which includes a state machine, microcontroller or microprocessor clocked by a clock generator, and at least a demodulator 8 of data contained in radio-frequency signals picked-up by the antenna 2. The demodulated data can be processed in the logic unit 6. Said data can be modulated in radio-frequency signals preferably by amplitude modulation (ASK modulation) or also by frequency modulation about a carrier frequency. It can be provided also a modulator 7 for transmitting by the same antenna 2 data radio-frequency signals by being controlled by the logic unit 6.

Usually the power-on reset circuit 5 supplies a power-on reset signal POR to the logic unit 6 to hold the logic unit 6 in a reset state for example with a signal POR at the high state if the rectified voltage $V_{DD}$ is less than a power-on reset voltage $V_{POR}$ from the power-on reset circuit 5. Said power-on reset voltage corresponds to a wake-up voltage, which can be initially set for example at 1.2 V. The logic unit 6 with the state machine, microcontroller or microprocessor is held in a reset state if the rectified voltage is below the determined wake-up voltage in order to prevent the state machine, microcontroller or microprocessor from potentially effecting erroneous operations or executing erroneous instructions. If the rectified voltage $V_{DD}$ is greater than the wake-up voltage $V_{POR}$, all the electronic parts of the transponder chip 1 can be power supplied to be able to communicate with another RFID transponder chip or a RF reader close to or at a distance from the RFID transponder chip 1.

According to the invention, the power-on reset circuit 5 can be trimmed by at least one trim value stored in the low-voltage non-volatile memory 4 at a rectified voltage level generally below the initial untrimmed power-on reset voltage of the power-on reset circuit 5. So the low-voltage non-volatile memory 4 can be supplied first when the rectified voltage increases after the reception of radio-frequency signals, and be able to supply directly at least one trim value signal Trim to the power-on reset circuit 5. The low-voltage non-volatile memory 4 can be supplied sufficient power at for example 0.3 V of the rectifier voltage $V_{DD}$. Said low voltage can be lower than 0.3 V depending on fabrication technologies or also at 0.5 V. Said low voltage is a fraction of a threshold voltage of a MOS transistor, which can decrease for smaller dimension technologies.

Said trim value signal Trim is preferably a binary word transmitted directly to the power-on reset circuit 5. So the trim value signal Trim allows trimming the power-on reset circuit 5 to adjust the wake-up voltage to a lower voltage level in comparison to the initial untrimmed power-on reset voltage. It is possible with the non-volatile memory which can be the first block to function at low power in the RFID transponder chip, to program directly the wake-up of the transponder chip by one or several trim values of at least one binary word supplied to the power-on reset circuit 5. The power-on reset voltage $V_{POR}$ can be established quickly to a minimum required wake-up voltage for allowing the RFID transponder chip 1 to communicate with a RF reader at a distance from the RFID transponder chip 1 greater than the distance from a prior art RFID transponder chip. So, less harvested energy from picked-up radio-frequency signals is necessary to allow the RFID transponder chip 1 to communicate with a RF reader or another RFID transponder chip.

Figure 2:
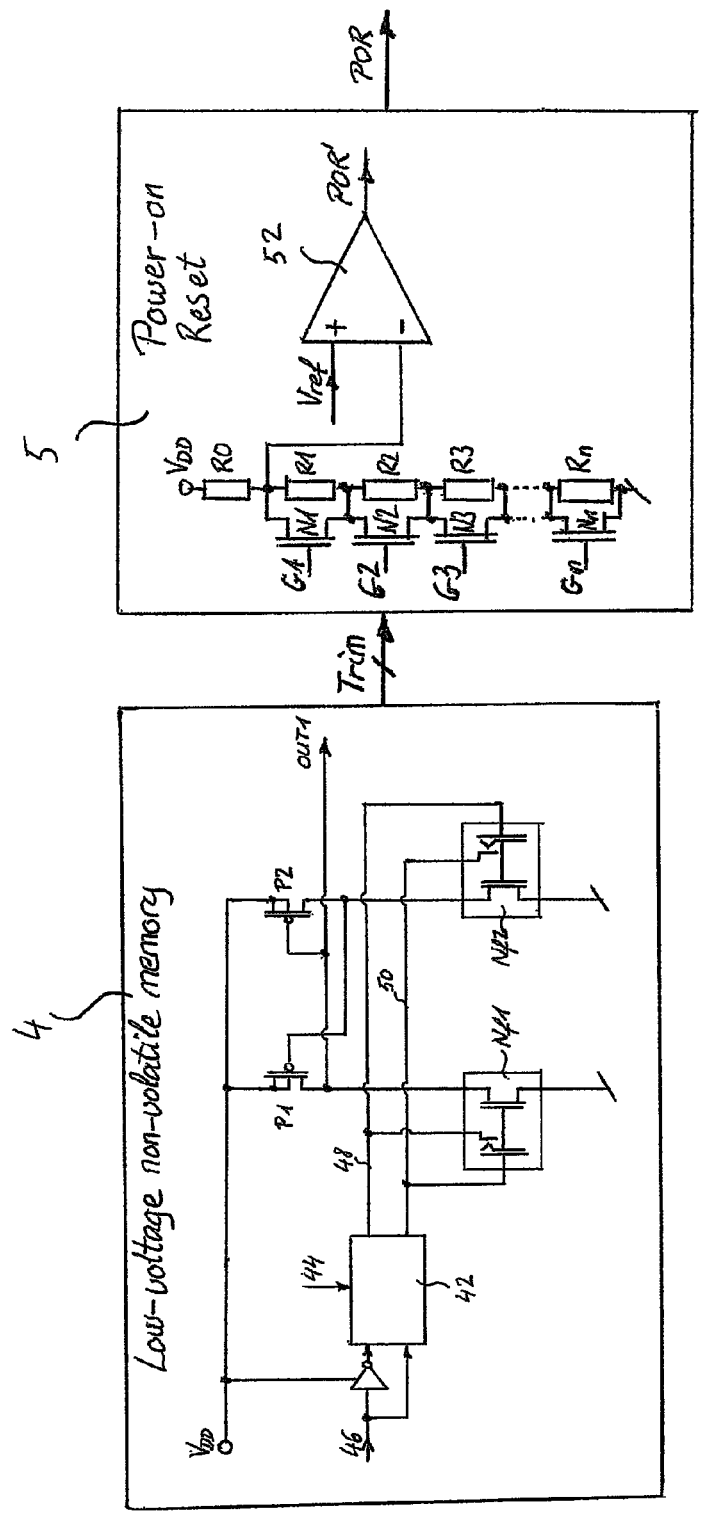
FIG. 2 shows an embodiment of the non-volatile memory and the power-on reset circuit of the RFID transponder chip with a programmable wake-up of the present invention.

In order to trim the power-on reset voltage of the power-on reset circuit 5, the input of the power-on reset circuit 5 can include a resistor divider R0, R1, R2, R3 to Rn and a comparator 52 as shown on FIG. 2. The resistor divider can be preferably composed of matched resistors with a same resistive value, but it can be provided also a series of resistors with power of 2 resistive values. A positive input of the comparator 52 can receive a reference voltage Vref generated for example by the regulator 3, whereas a negative input of the comparator 52 is connected to one node of the resistor divider connected between the rectified voltage terminal $V_{DD}$ and ground terminal. For example, the connection node between the base resistor R0 and the first resistor R1 is connected to the negative input of the comparator 52. The reference voltage Vref can be defined at a voltage under 1 V, for example at 0.6 V if the rectified voltage is up to 0.6 V. When the rectified voltage $V_{DD}$ is greater than the wake-up voltage, the comparator output POR' passes from high level to a low level in an identical manner to the power-on reset signal POR provided at the output of the power-on reset circuit 5.

Some switches N1, N2, N3 to Nn are connected between successive nodes of the resistor connection under the node connected to the negative input of the comparator 52. So a first switch N1 is placed in parallel with the first resistor R1, a second switch N2 is placed in parallel with a second resistor R2, a third switch N3 is placed in parallel with a third resistor R3 until a final switch Nn placed in parallel with a final resistor Rn. Said switches can be composed of MOS transistors, for example NMOS transistors N1, N2, N3 to Nn each controlled on their gates G1, G2, G3 to Gn by the trim values Trim from the non-volatile memory 4. Said switches allow short-circuiting some resistors of the divider on the basis of the trim binary word Trim from the non-volatile memory 4. As a function of the programmed trim binary word, which corresponds to the trim values, the power-on reset circuit 5 can be trimmed directly to a trimmed voltage, which can be defined the low voltage wake-up voltage of the RFID transponder chip 1. Said binary word Trim can be already supplied to the power-on reset circuit since the rectified voltage $V_{DD}$ has a minimum voltage equal to at least 0.3 V.

The non-volatile memory 4 can be one part of an EEPROM memory of the RFID transponder chip. The trim dedicated cells of the non-volatile memory 4 can share bit lines with other non-trim cells of the EEPROM memory and are written via said shared bit lines. The trim dedicated cells contains at least one trim binary word, which correspond to the trim values to be supplied by the non-volatile memory 4 to the power-on reset circuit 5 at a low rectified voltage $V_{DD}$. Each cell can be made with at least one floating-gate MOS transistor well known. As a function of the state of the floating gate, the cell is programmed to a "1" state or to a "0" state. In the "1" state, the floating-gate MOS transistor can be for example in conductive state, whereas in the "0" state, the floating-gate MOS transistor can be in non-conductive state, or inversely.

FIG. 2 shows one part of the low-voltage non-volatile memory 4 for supplying for example one trim value (one bit) in the output signal Trim. In this embodiment, two cross-coupled memory cells are provided, each of which comprising a floating-gate transistor Nf1 and Nf2 of NMOS type connected to a ground terminal and an associated PMOS transistor P1 and P2 connected to a rectified voltage terminal $V_{DD}$. The low-voltage non-volatile memory 4 generally includes several cross-coupled memory cells for supplying a binary word with n bits in the output signal Trim. Said n-bit word depends on the number of resistors of the resistor divider in the power-on reset circuit 5 to be controlled for trimming the power-on reset voltage of said power-on reset circuit 5.

For the cross-coupled memory cells, the drain of the first floating-gate transistor Nf1 is connected to a drain of the first PMOS transistor P1 and to a gate of the second PMOS transistor P2. The drain of the second floating-gate transistor Nf2 is connected to the drain of the second PMOS transistor P2 and to the gate of the first PMOS transistor P1. Furthermore, a control gate of the first floating-gate transistor Nf1 is coupled to a second output 50 of a level shifter 42. A first output 48 of the level shifter 42 is coupled to the control gate of the second floating-gate transistor Nf2. The drain of the first floating-gate transistor Nf1 is connected to the output OUT1 for supplying one trim value, whereby a complementary signal can be obtained at the drain of the second floating-gate transistor Nf2.

The two input lines 44 and 46 are connected to the level shifter 42 for programming the memory cells. In a programming procedure, a voltage on input 46, either selecting a state "1" or a state "0" is provided. The signal provided on input line 46 is the digital control signal to select the state of the cell after a higher voltage HV required for programming the cell is provided on input line 44. This embodiment of the memory cell is also described in the U.S. Pat. No. 7,868,764 B2 in particular in the disclosure referring to FIG. 2.

It should be noted that each level shifter 42 is preferably placed in the logic unit 6 and not directly in the non-volatile memory 4. All the memory cells of the non-volatile memory 4 can be written by the corresponding level shifter 42 only if the RFID transponder chip 1 is awake at a rectified voltage $V_{DD}$ greater than the wake-up voltage. Each level shifter 42 can be used also for reading each memory cell of the non-volatile memory 4 as it is well known.

After the initial programming operation, the two floating-gate transistors Nf1 and Nf2 contain the stored data, in particular the data and the data complement. This data can only be changed by application of a high voltage via output lines 48, 50. As soon as a reduced voltage level of the rectified voltage $V_{DD}$ is supplied, the memory cells Nf1 and Nf2 provide their stored status. If a cell is turned "off", its drain is pulled up via the first or second PMOS transistors P1 and P2 towards the rectified voltage $V_{DD}$ as it is well known. Otherwise, if the cell is turned "on", its drain is pulled down to the ground voltage. The output OUT1 of the memory cell in the signal Trim is tied to one gate of a series control switch N1, N2, N3 to Nn in the power-on reset circuit 5 as above-explained.

With the arrangement of the non-volatile memory 4 connected to the power-on reset circuit 5, the sensitivity of the RFID transponder chip 1 is improved by trimming the power-on-reset circuit during the application of power prior to the chip power supply voltage level reaching a wake-up voltage level at which the RFID transponder chip can begin communicating. The minimum RF power required to maintain communication with the reader, which is a function of the distance between the RFID transponder chip 1 and an RF reader, is referred to as the "sensitivity" of the RFID transponder chip 1.

So as above-explained, the trimming is performed by reading at least one trim value from the non-volatile memory 4 capable of operating at a chip power supply voltage level lower than the wake-up voltage level.

Due to manufacturing and temperature variation, the power-on reset voltage $V_{POR}$ varies resulting in a specified sensitivity that represents the expected worst case $V_{POR}$ plus some margin. For an improved sensitivity specification, the power-on reset circuit 5 is trimmed to reduce the variation of power-on reset voltage $V_{POR}$ to the lowest level at which the RFID transponder chip 1 can be operated. The trim values are determined in particular during the testing of the RFID transponder chips prior to shipment and stored in non-volatile memory 4.

It should be noted that the sensitivity specification of such an RFID transponder chip 1 can be improved if there is a smaller variation of wake-up power levels between RFID transponder chips. In addition to the sensitivity specification, it can be possible to specify the distribution of this specification so that a customer's reader system can be designed with less complexity and therefore lower cost for certain applications like vehicle toll collection. This is true because a smaller spread of RFID transponder chip sensitivities does not require as much worst case interference rejection and collision processing as a larger spread.

For an RFID transponder chip of the present invention, the specifications might be as follows:

| No. | Specification | Value |
| --- | --- | --- |
| 1 | Minimum wake-up sensitivity RF power level | −15 dBm |
| 2 | Maximum wake-up sensitivity RF power level | −12 dBm |
| 3 | Maximum operating RF power level | +20 dBm |

These are RF power levels into the antenna 2 for the RFID transponder chip 1. The alternative voltage AC on the antenna 2 is rectified on-chip to a rectified voltage, then regulated to produce the on-chip supply level $V_{DD}$. This is the rectified or regulated voltage $V_{DD}$ that the power-on-reset circuit 5 monitors to then output the power-on reset signal POR, which is high below some predetermined voltage level, which is defined as the wake-up voltage.

An alternative benefit of trimming the power-on reset voltage $V_{POR}$ starting below the wake-up voltage is RFID transponder yield improvement. In this case, there is an aggressive, low spread specification as above-mentioned in the table (−15 dBm to −12 dBm), but without the trimming of the power-on reset circuit 5, there is a severe yield loss, if the spread is between −16 dBm to −11 dBm, and the test limits only allow −14 dBm to −13 dBm.

On the basis of the description just given, numerous variants of the low-voltage RFID transponder chip can be designed by a person skilled in the art without departing from the scope of the invention as defined in the claims. The RFID transponder chip can be a dual mode transponder chip in order to be in a passive mode or in an active mode. A switch in the power-on reset circuit can be able to be connected to more than one resistor in order to be able to short-circuit two or more resistors of the resistor divider depending on one trim value from the non-volatile memory.

What is claimed is:

1. An RFID transponder chip, which includes:
  at least one antenna to pick-up radio-frequency signals,
  a rectifier to store charge on at least one capacitor at a rectified voltage from the picked-up radio-frequency signals,
  a power-on reset circuit to maintain a logic unit in a reset state if the rectified voltage level is less than a power-on reset or wake-up voltage level of the power-on reset circuit above which the logic unit can operate,
  wherein the RFID transponder chip further includes a non-volatile memory, in which are stored one or several trim power-on reset values, said non-volatile memory being directly connected to the power-on reset circuit in order to be able to provide directly at least one trim power-on reset value to trim the power-on reset circuit, first when the rectified voltage increases after the reception of radio frequency signals and at a rectified voltage level below a wake-up voltage level.

2. The RFID transponder chip according to claim 1, wherein several trim values are stored in the non-volatile memory, which is able to supply a trim binary word to the power-on reset circuit in order to trim the power-on reset circuit at a rectified voltage level below an initial wake-up voltage.

3. The RFID transponder chip according to claim 1, wherein the RFID transponder chip includes a demodulator connected to the logic unit, able to demodulate data in radio-frequency signals picked-up by the antenna if the rectified voltage is at least greater than the trimmed power-on reset voltage.

4. The RFID transponder chip according to claim 1, wherein the RFID transponder chip includes a modulator connected to the logic unit to transmit by the same antenna data radio-frequency signals controlled by the logic unit in operating state.

5. The RFID transponder chip according to claim 1, wherein the RFID transponder chip includes a regulator in the rectifier in order to generate a regulated voltage for power supplying some electronic parts of the transponder chip.

6. The RFID transponder chip according to claim 1, wherein the non-volatile memory includes one or several memory cells each comprising at least one floating-gate MOS transistor in order to store one or several trim values to be transmitted directly to the power-on reset circuit at a rectifier voltage below the wake-up voltage of the logic unit.

7. The RFID transponder chip according to claim 6, wherein the non-volatile memory includes several pairs of cross-coupled memory cells, each of which comprising a floating-gate transistor of NMOS type connected to a ground terminal and an associated PMOS transistor connected to a rectified voltage terminal.

8. The RFID transponder chip according to claim 7, wherein for the pairs of cross-coupled memory cells, a drain of a first floating-gate transistor is connected to a drain of a first PMOS transistor and to a gate of a second PMOS transistor, wherein a drain of a second floating-gate transistor is connected to a drain of the second PMOS transistor and to a gate of the first PMOS transistor, and wherein the drain of the first floating-gate transistor is connected to an output of the non-volatile memory for supplying one trim value to the power-on reset circuit.

9. The RFID transponder chip according to claim 6, wherein the power-on reset circuit includes a resistor divider and a comparator, which receives at a positive input a reference voltage from a regulator in the rectifier, and is connected at a negative input to one node of the resistor divider connected between a rectified voltage terminal and a ground terminal, and wherein several switches are connected in parallel of each resistor between successive nodes of the resistor connection under the node connected to the negative input of the comparator, said switches being controlled by the trim values received from the non-volatile memory for short-circuiting or not some resistors for trimming the power-on reset voltage of the power-on reset circuit.

10. The RFID transponder chip according to claim 9, wherein the resistor divider is composed of matched resistors each having a same resistive value.

11. The RFID transponder chip according to claim 9, wherein said switches are composed of NMOS transistors, gates of said NMOS transistors being controlled by the trim values.

12. The RFID transponder chip according to claim 1, wherein the non-volatile memory is able to provide trim values to the power-on reset circuit at a rectified voltage equal to 0.3 V, and wherein the power-on reset circuit is trimmed by the trim values from the non-volatile memory in order to establish a trimmed power-on reset voltage at a lowest possible wake-up voltage, which is set between 1.0 and 1.4 V.

13. An RFID transponder chip, which includes:
at least one antenna to pick-up radio-frequency signals,
a rectifier to store charge on at least one capacitor at a rectified voltage from the picked-up radio-frequency signals,
a power-on reset circuit to maintain a logic unit in a reset state if the rectified voltage level is less than a power-on reset or wake-up voltage level of the power-on reset circuit above which the logic unit can operate,
wherein the RFID transponder chip further includes a non-volatile memory, in which are stored one or several trim values, said non-volatile memory being directly connected to the power-on reset circuit in order to be able to provide at least one trim value to trim the power-on reset circuit at a rectified voltage level below a wake-up voltage level,
wherein the power-on reset circuit includes a resistor divider and a comparator, which receives at a positive input a reference voltage from a regulator in the rectifier, and is connected at a negative input to one node of the resistor divider connected between a rectified voltage terminal and a ground terminal, and
wherein several switches are connected in parallel of each resistor between successive nodes of the resistor connection under the node connected to the negative input of the comparator, said switches being controlled by the trim values received from the non-volatile memory for short-circuiting or not some resistors for trimming the power-on reset voltage of the power-on reset circuit.

14. The RFID transponder chip according to claim 13, wherein the resistor divider is composed of matched resistors each having a same resistive value.

15. The RFID transponder chip according to claim 13, wherein said switches are composed of NMOS transistors, gates of said NMOS transistors being controlled by the trim values.

* * * * *